(12) United States Patent
Kim et al.

(10) Patent No.: US 11,228,062 B2
(45) Date of Patent: Jan. 18, 2022

(54) BATTERY PACK AND POWER SYSTEM COMPRISING SAME

(71) Applicant: LG CHEM, LTD., Seoul (KR)

(72) Inventors: Hak-In Kim, Daejeon (KR); Dong-Hyun Kim, Daejeon (KR); Ho-Chol Nam, Daejeon (KR)

(73) Assignee: LG Chem, Ltd., Seoul (KR)

( * ) Notice: Subject to any disclaimer, the term of this patent is extended or adjusted under 35 U.S.C. 154(b) by 163 days.

(21) Appl. No.: 16/488,753

(22) PCT Filed: Oct. 16, 2018

(86) PCT No.: PCT/KR2018/012208
§ 371 (c)(1),
(2) Date: Aug. 26, 2019

(87) PCT Pub. No.: WO2019/078589
PCT Pub. Date: Apr. 25, 2019

(65) Prior Publication Data
US 2021/0143485 A1    May 13, 2021

(30) Foreign Application Priority Data
Oct. 18, 2017    (KR) ........................ 10-2017-0135473

(51) Int. Cl.
*H01M 10/42*    (2006.01)
*H01M 50/597*    (2021.01)
(Continued)

(52) U.S. Cl.
CPC ....... *H01M 10/425* (2013.01); *H01M 10/441* (2013.01); *H01M 10/46* (2013.01);
(Continued)

(58) Field of Classification Search
CPC ............. H01M 10/425; H01M 50/597; H01M 50/204; H01M 50/543; H01M 2010/4271;
(Continued)

(56) References Cited

U.S. PATENT DOCUMENTS 5,526,215 A    6/1996 Higashijima et al.
5,530,336 A    6/1996 Eguchi et al.
(Continued)

FOREIGN PATENT DOCUMENTS

CN    101425693 A    5/2009
CN    103762691 B    12/2015
(Continued)

OTHER PUBLICATIONS

Extended European Search Report dated Apr. 2, 2020 issued in corresponding European App. No. 18867603.5.
(Continued)

*Primary Examiner* — Sun J Lin
(74) *Attorney, Agent, or Firm* — Morgan, Lewis & Bockius LLP (57) ABSTRACT

Provided is a battery pack and a power system including the same. The battery pack includes a battery module having a positive electrode terminal and a negative electrode terminal, a first connector having a first power terminal connected to the positive electrode terminal, a second power terminal connected to the negative electrode terminal and a first auxiliary terminal, a first resistor having a first end electrically connected to ground and a second end electrically connected to the first auxiliary terminal, a switching unit installed between the negative electrode terminal and the second power terminal, and a control unit. The control unit is configured to operate in any one of a wakeup state and a sleep state according to a voltage of the first resistor.

19 Claims, 6 Drawing Sheets

(51) Int. Cl.
*H01M 50/204* (2021.01)
*H01M 50/543* (2021.01)
*H01M 10/46* (2006.01)
*H01M 10/44* (2006.01)
*H02J 7/00* (2006.01)

(52) U.S. Cl.
CPC ....... *H01M 50/204* (2021.01); *H01M 50/543* (2021.01); *H01M 50/597* (2021.01); *H02J 7/0013* (2013.01); *H02J 7/0031* (2013.01); *H01M 2010/4271* (2013.01); *H01M 2200/30* (2013.01)

(58) Field of Classification Search
CPC .......... H01M 10/441; H01M 2200/30; H01M 10/46; H02J 7/0031; H02J 7/0013
USPC ........................................................ 320/134
See application file for complete search history.

(56) References Cited

U.S. PATENT DOCUMENTS

| | | | |
|---|---|---|---|
| 7,453,232 B2 * | 11/2008 | Furukawa | B60L 3/0069 320/104 |
| 8,264,204 B2 * | 9/2012 | Nagaoka et al. | B60L 58/19 320/136 |
| 8,305,043 B2 * | 11/2012 | Yamamoto et al. | G01R 19/0084 320/150 |
| 9,800,170 B2 * | 10/2017 | Shao | H02J 50/001 |
| 10,199,679 B2 * | 2/2019 | Abe | H01M 10/4257 |
| 10,978,945 B2 * | 4/2021 | Matsuda et al. | H02M 3/33507 |
| 2009/0111005 A1 | 4/2009 | Hur | |
| 2010/0072975 A1 | 3/2010 | Hori | |
| 2010/0085020 A1 | 4/2010 | Suzuki et al. | |
| 2011/0304299 A1 | 12/2011 | Yang et al. | |
| 2012/0032639 A1 | 2/2012 | Kim et al. | |
| 2012/0299549 A1 | 11/2012 | Kim et al. | |
| 2012/0299554 A1 | 11/2012 | Kruglick | |
| 2013/0038294 A1 | 2/2013 | Hur | |
| 2014/0017528 A1 | 1/2014 | Uehara et al. | |
| 2014/0095093 A1 | 4/2014 | Hong et al. | |
| 2016/0344205 A1 | 11/2016 | Abe | |
| 2017/0005499 A1 | 1/2017 | Zhang et al. | |
| 2018/0342885 A1 | 11/2018 | Hong | |

FOREIGN PATENT DOCUMENTS

| | | |
|---|---|---|
| EP | 2 056 423 A2 | 5/2009 |
| EP | 3 618 168 A1 | 4/2020 |
| JP | H01-173262 A | 7/1989 |
| JP | H05-207672 A | 8/1993 |
| JP | H06-105457 A | 4/1994 |
| JP | H08-37737 A | 2/1996 |
| JP | H11-215716 A | 8/1999 |
| JP | H11-234910 A | 8/1999 |
| JP | 2001-283934 A | 10/2001 |
| JP | 2005-348468 A | 12/2005 |
| JP | 2007-42396 A | 2/2007 |
| JP | 2010-115087 A | 5/2010 |
| JP | 2012-170226 A | 9/2012 |
| JP | 2014-050138 A | 3/2014 |
| JP | 2014-515918 A | 7/2014 |
| JP | 2016-158333 A | 9/2016 |
| KR | 10-0549342 B1 | 2/2006 |
| KR | 10-2011-0106584 A | 9/2011 |
| KR | 10-2011-0134741 A | 12/2011 |
| KR | 10-2012-0013776 A | 2/2012 |
| KR | 10-2012-0085527 A | 8/2012 |
| KR | 10-2012-0132336 A | 12/2012 |
| KR | 10-1504274 B1 | 3/2015 |
| KR | 10-1628606 B1 | 6/2016 |
| KR | 10-2016-0114796 A | 10/2016 |
| KR | 10-2017-0072589 A | 6/2017 |
| WO | 2012/132134 A1 | 10/2012 |

OTHER PUBLICATIONS

Office Action dated Jul. 22, 2020 issued in corresponding KR App. No. 10-2017-0135473.
First Office Action dated Aug. 31, 2020, issued in corresponding Japanese Patent Application No. 2019-540579.
International Search Report dated Jan. 25, 2019, issued in corresponding International application No. PCT/KR2018/012208.
Office Action dated Nov. 12, 2021, issued in corresponding Chinese Patent Application No. 201880008589.6.

* cited by examiner

BATTERY PACK AND POWER SYSTEM COMPRISING SAME

TECHNICAL FIELD

The present disclosure relates to a battery pack and a power system including the same, and more particularly, to a battery pack for controlling electrical connection with an external device using the voltage division rule and a power system including the same.

The present application claims priority to Korean Patent Application No. 10-2017-0135473 filed in the Republic of Korea on Oct. 18, 2017, the disclosure of which is incorporated herein by reference.

BACKGROUND ART

Recently, there is dramatically growing demand for portable electronic products such as laptop computers, video cameras and mobile phones, and with the intense development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

A battery pack may be detachably coupled to the body of a wireless device such as a wireless cleaner, and a battery pack that can provide a high output voltage is used to increase the output power of an electric powered device. To charge and discharge the battery pack, it is necessary to install a charge/discharge switch on the high side or low side of the battery pack. When the charge/discharge switch is installed on the high side of the battery pack, a charge pump and a gate driver are required, and accordingly it takes a higher manufacturing cost than the manufacturing cost required when the charge/discharge switch is installed on the low side of the battery pack.

Meanwhile, in case that the charge/discharge switch installed on the low side of the battery pack is turned off, when the battery pack is coupled to the body of the electric powered device, there is a ground voltage mismatch problem between the battery pack and the body of the electric powered device. Accordingly, communication between the battery pack and the body of the electric powered device cannot be normally made, and it is difficult to properly turn on the charge/discharge switch. To solve this problem, when the charge/discharge switch is always kept in turn on state, two power terminals of the battery pack are unintentionally electrically shorted, and there is a spike risk.

DISCLOSURE

Technical Problem

The present disclosure is designed to solve the problems such that those described above, and therefore the present disclosure is directed to providing a battery pack that may control a charge/discharge switch installed on low side by determining if electrical coupling with an external device is normally made using the voltage division rule and a power system including the same.

These and other objects and advantages of the present disclosure will be understood by the following description and will be apparent from the embodiments of the present disclosure. Additionally, it will be readily understood that the objects and advantages of the present disclosure are realized by the means set forth in the appended claims and combinations thereof.

Technical Solution

Various embodiments of the present disclosure for achieving the above-described object are as follows.

A battery pack according to an embodiment of the present disclosure includes a battery module having a positive electrode terminal and a negative electrode terminal, a first connector having a first power terminal connected to the positive electrode terminal, a second power terminal connected to the negative electrode terminal and a first auxiliary terminal, a first resistor having a first end electrically connected to ground and a second end electrically connected to the first auxiliary terminal, a switching unit installed between the negative electrode terminal and the second power terminal, and a control unit electrically connected to the battery module, the switching unit and the second end of the first resistor. The control unit is configured to operate in any one of a wakeup state and a sleep state according to a voltage across the first resistor.

According to an aspect, the battery pack may further include a second resistor electrically connected between the second end of the first resistor and the first auxiliary terminal.

According to another aspect, the control unit may include a subcontrol module electrically connected to the second end of the first resistor, and configured to measure a voltage across the battery module, and a main control module configured to receive a voltage signal indicating the voltage across the battery module from the subcontrol module, and transmit a control signal to the subcontrol module based on the voltage signal.

In this case, the subcontrol module may supply an operating power to the main control module when the voltage across the first resistor is in a threshold range. The main control module may shift from the sleep state to the wakeup state when the operating power is supplied from the subcontrol module. The main control module may transmit a shutdown command to the subcontrol module when the voltage across the first resistor is outside of the threshold range while in the wakeup state. The subcontrol module may stop supplying the operating power to the main control module, in response to the shutdown command from the main control module.

Alternatively, the subcontrol module may stop supplying the operating power to the main control module when the voltage across the first resistor is outside of the threshold range while the main control module operates in the wakeup state.

According to still another aspect, the switching unit may include a charge switch, and a discharge switch connected in series to the charge switch. The control unit may stop outputting a switching signal for the charge switch and the discharge switch while in the sleep state.

A power system according to another embodiment of the present disclosure includes the battery pack, and an external device that can be attached and detached to/from the battery pack. The external device includes a second connector having a third power terminal connectable to the first power terminal, a fourth power terminal connectable to the second power terminal and a second auxiliary terminal connectable to the first auxiliary terminal. The third power terminal and the second auxiliary terminal may be electrically connected to each other.

According to an aspect, the external device may further include a third resistor electrically connected between the third power terminal and the second auxiliary terminal.

According to another aspect, the external device may further include a protective capacitor electrically connected between the third power terminal and the fourth power terminal.

According to still another aspect, the second connector may be configured to have an electrical connection between the first power terminal and the third power terminal and an electrical connection between the first auxiliary terminal and the second auxiliary terminal earlier than an electrical connection between the second power terminal and the fourth power terminal, when coupled to the first connector.

Advantageous Effects

According to at least one of the embodiments of the present disclosure, it is possible to control a charge/discharge switch installed on the low side by determining if electrical coupling with an external device is normally made using the voltage division rule.

In addition, according to at least one of the embodiments of the present disclosure, only when coupled with a preset external device, the charge/discharge switch installed on the low side may be turned on. Accordingly, the charge/discharge switch is kept in turn off state to prevent dangers such as a user's electric shock or spikes even though two power terminals of the battery pack are unintentionally connected by a certain conductor.

The effects of the present disclosure are not limited to the above-mentioned effects, and other effects not mentioned herein will be clearly understood by those skilled in the art from the appended claims.

BRIEF DESCRIPTION OF THE DRAWINGS

The accompanying drawings illustrate preferred embodiments of the present disclosure, and together with the following detailed description, serve to provide a further understanding of the technical aspects of the present disclosure, and the present disclosure is not construed as being limited to the drawings.

MODE FOR CARRYING OUT THE INVENTION

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and variations could be made thereto at the time of filing the application.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

Figure 1:
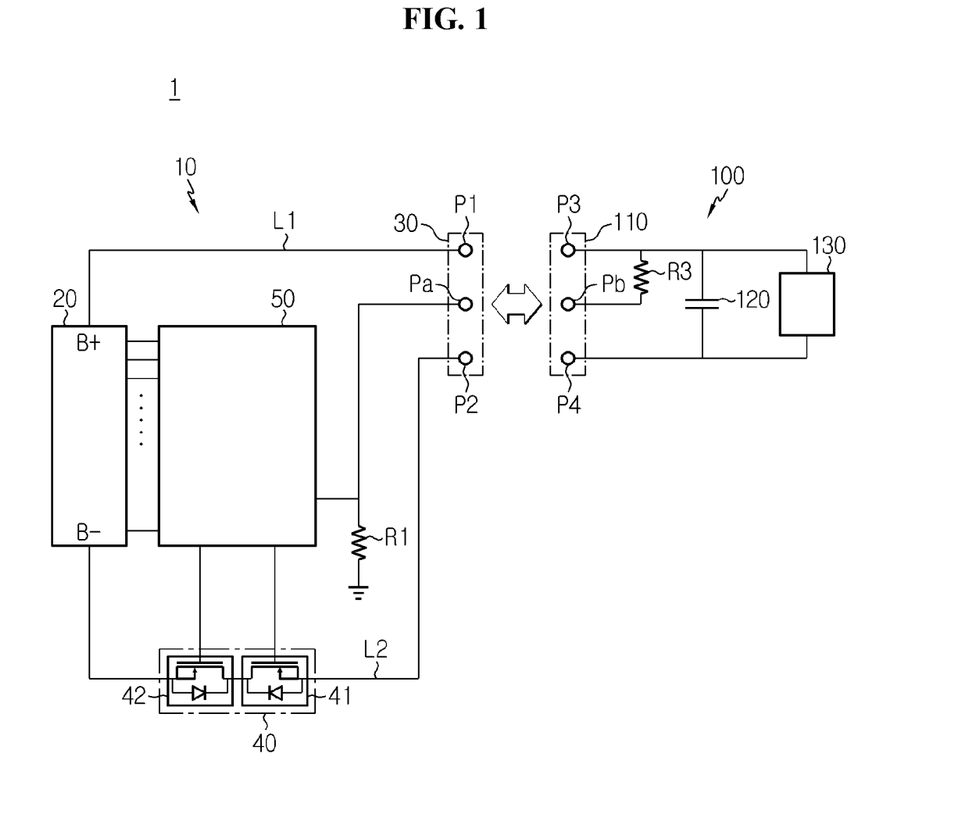
FIGS. 1 to 3 are diagrams showing functional architectures of power systems according to embodiments of the present disclosure.
Figure 2:
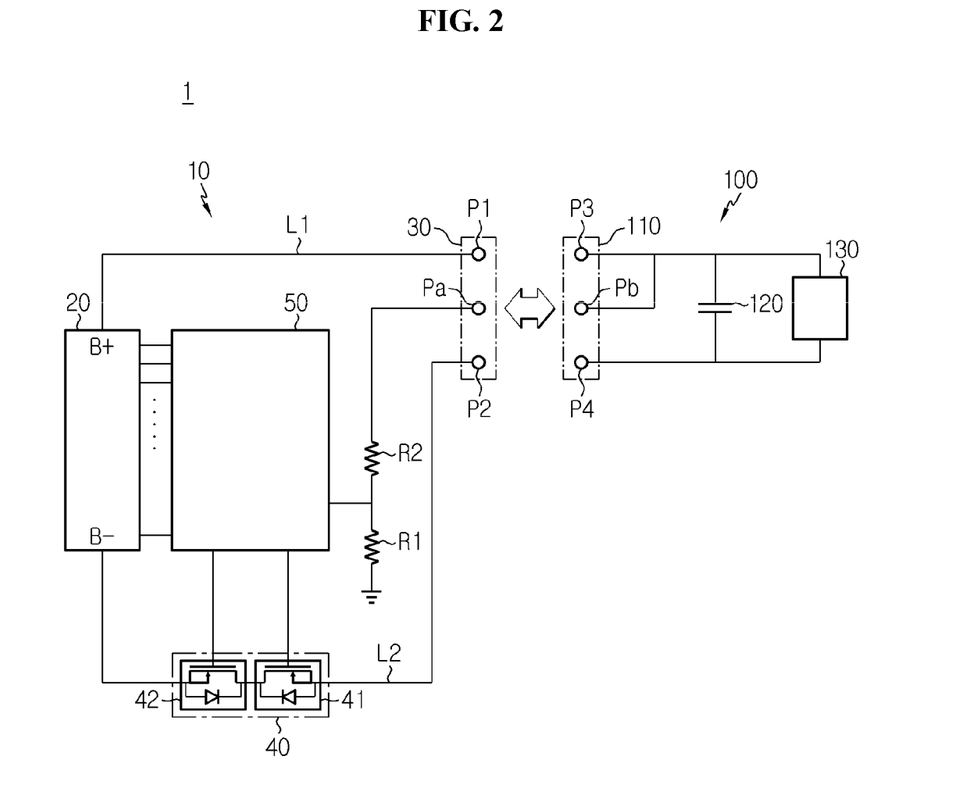
Figure 3:
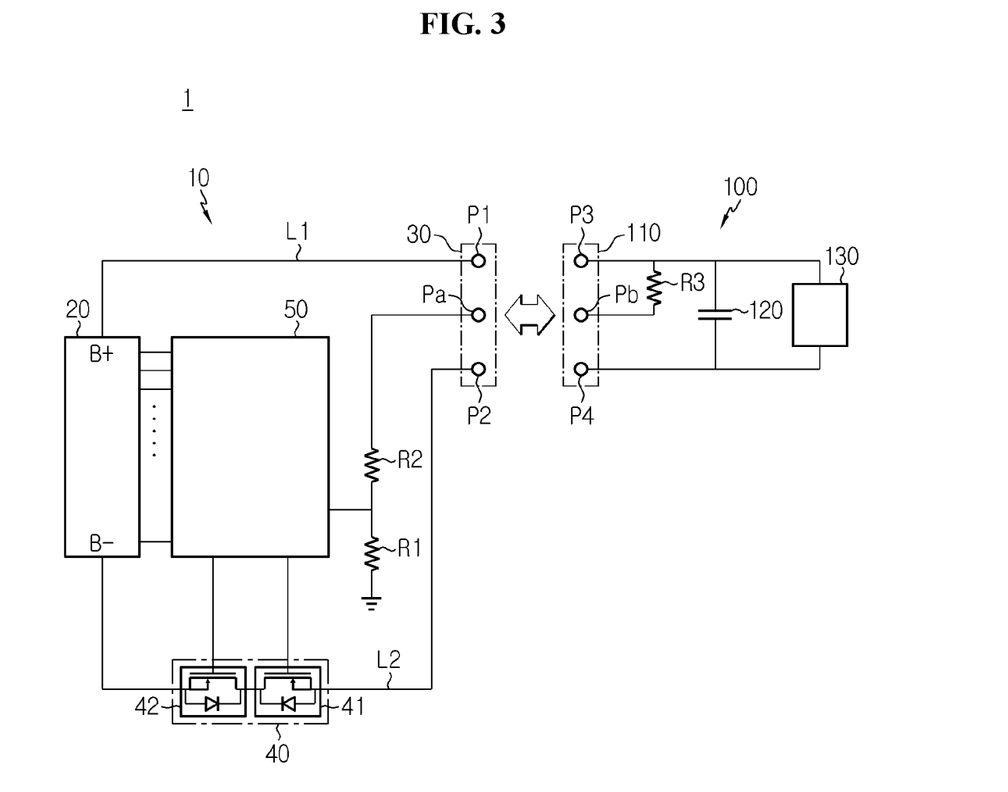

FIGS. 1 to 3 are diagrams showing functional architectures of different power systems 1 according to embodiments of the present disclosure.

First, referring to FIG. 1, the power system 1 includes a battery pack 10 and an external device 100.

The battery pack 10 includes a battery module 20, a first connector 30, a resistor R1, a switching unit 40 and a control unit 50.

The battery module 20 may include at least one battery cell. When the battery module 20 includes a plurality of battery cells electrically connected to each other, the plurality of battery cells may be connected in series, in parallel, or in series and in parallel. The battery module 20 has a positive electrode terminal and a negative electrode terminal. The positive electrode terminal of the battery module 20 is electrically connected to the first connector 30 through a first power line L1. The negative electrode terminal of the battery module 20 is electrically connected to the first connector 30 through a second power line L2.

The high side of the battery pack 10 may refer to part between the positive electrode terminal of the battery module 20 and the first connector 30 connected through the first power line L1. The low side of the battery pack 10 may refer to part between the negative electrode terminal of the battery module 20 and the first connector 30 connected through the second power line L2.

The first connector 30 includes a first power terminal P1, a second power terminal P2 and a first auxiliary terminal Pa. The first power terminal P1 is connected to the positive electrode terminal of the battery module 20 through the first power line L1. The second power terminal P2 is connected to the negative electrode terminal of the battery module 20 through the second power line L2. The first auxiliary terminal Pa is connected to the resistor R1 as described below. The first connector 30 may have an exposed structure to see at least part of the first power terminal P1, the second power terminal P2 and the first auxiliary terminal Pa with a naked eye from the outside, and may be physically coupled to or separated from a second connector 110 included in the external device 100.

The resistor R1 has a first end and a second end. The resistor R1 is one of two or more resistors used to divide the voltage (hereinafter referred to as 'pack voltage') across the battery pack 10 applied between the first power terminal P1 and the second power terminal P2. The first end of the resistor R1 is electrically connected to the ground. The second end of the resistor R1 is electrically connected to the first auxiliary terminal Pa. The switching unit 40 is installed between the negative electrode terminal of the battery module 20 and the second power terminal P2. That is, the switching unit 40 is installed on the second power line L2 corresponding to the low side of the battery pack 10. The switching unit 40 includes a charge switch 41 and a discharge switch 42 connected in series. Each of the charge switch 41 and the discharge switch 42 may include a Field Effect Transistor (FET) and a parasitic diode connected in parallel. Each FET includes a drain, a source and a gate. The gates of each FET may be connected to the control unit 50 to receive a switching signal from the control unit 50 as described below.

The drain and the source of the FET of the charge switch 41 may be connected to provide a charge current channel. On the contrary, the drain and the source of the FET of the discharge switch 42 may be connected to provide a discharge current channel.

The parasitic diode of the charge switch 41 may be connected in a discharge current direction, and the parasitic diode of the discharge switch 42 may be connected in a charge current direction. Accordingly, when the FET of the charge switch 41 is in turn off state, only the discharge current channel through the parasitic diode of the charge switch 41 may be provided, and when the FET of the discharge switch 42 is in turn off state, only the charge current channel through the parasitic diode of the discharge switch 42 may be provided.

The control unit 50 is electrically connected to the battery module 20, the first connector 30, the resistor R1 and the switching unit 40. The control unit 50 is configured to detect the voltage across the resistor R1, i.e., the voltage (hereinafter referred to as 'divided voltage') applied between the first end and the second end of the resistor R1, and operate in one of wakeup state and sleep state in response to the detected divided voltage. That is, the control unit 50 is configured to always operate in sleep state when the battery pack 10 is separated from the external device 100, and shift from sleep state to wakeup state when the battery pack 10 is electrically coupled to the external device 100.

In sleep state, the control unit 50 keeps the charge switch 41 and the discharge switch 42 in turn off state. That is, the control unit 50 may stop outputting the switching signal for each of the charge switch 41 and the discharge switch 42 while the control unit 50 is in sleep state.

In wakeup state, the control unit 50 may control at least one of the charge switch 41 and the discharge switch 42 into turn on state according to communication with the external device 100. The configuration of the control unit 50 will be described in more detail with reference to FIGS. 4 and 5 below.

The external device 100 may be a charger or an electric load (e.g., a motor driving device of a cleaner). Hereinafter, to help understanding, the electric load is referred to as an 'electric powered device body'. The battery pack 10 may be detachably coupled to the external device 100. Alternatively, the battery pack 10 may be embedded in the electric powered device body.

The external device 100 includes a second connector 110 and a resistor R3, and optionally, may further include a protective capacitor 120. When the external device 100 is a cleaner, the external device 100 may further include a driving circuit 130.

The second connector 110 includes a third power terminal P3, a fourth power terminal P4 and a second auxiliary terminal Pb, and may be physically coupled to or separated from the first connector 30. When the first connector 30 and the second connector 110 are physically coupled to each other, the third power terminal P3 may be electrically connected to the first power terminal P1, the fourth power terminal P4 may be electrically connected to the second power terminal P2, and the second auxiliary terminal Pb may be electrically connected to the first auxiliary terminal Pa.

A resistor R3 has a first end and a second end. The resistor R3 is electrically connected between the third power terminal P3 and the second auxiliary terminal Pb. In detail, the first end of the resistor R3 is electrically connected to the second auxiliary terminal Pb, and the second end of the resistor R3 is electrically connected to the third power terminal P3. Accordingly, when the first connector 30 and the second connector 110 are physically coupled to each other, the resistor R1 and the resistor R3 are electrically connected in series, and act as a voltage divider. That is, voltage between the third power terminal P3 and the ground may be divided by the resistor R1 and the resistor R3.

The protective capacitor 120 has a first end and a second end. The protective capacitor 120 may be electrically connected between the third power terminal P3 and the fourth power terminal P4. In detail, the first end of the protective capacitor 120 may be electrically connected to the fourth power terminal P4, and the second end of the protective capacitor 120 may be electrically connected to the third power terminal P3. The protective capacitor 120 plays a role in preventing an abrupt change in the voltage applied between the third power terminal P3 and the fourth power terminal P4 due to the physical coupling of the first connector 30 and the second connector 110.

Subsequently, referring to FIG. 2, when comparing with FIG. 1, there are differences in that the battery pack 10 further includes a resistor R2, and the resistor R3 of the external device 100 is omitted. In this case, the third power terminal P3 of the second connector 110 and the second auxiliary terminal Pb may be electrically connected to each other directly or through a conductor. When the first connector 30 and the second connector 110 are physically coupled to each other, the resistor R1 and the resistor R2 are electrically connected in series and act as a voltage divider.

Subsequently, referring to FIG. 3, there are differences from FIGS. 1 and 2 in that the battery pack 10 includes a resistor R2, and the external device 100 includes a resistor R3. When the first connector 30 and the second connector 110 are physically coupled to each other, the resistor R1, the resistor R2 and the resistor R3 are electrically connected in series and act as a voltage divider.

Figure 4:
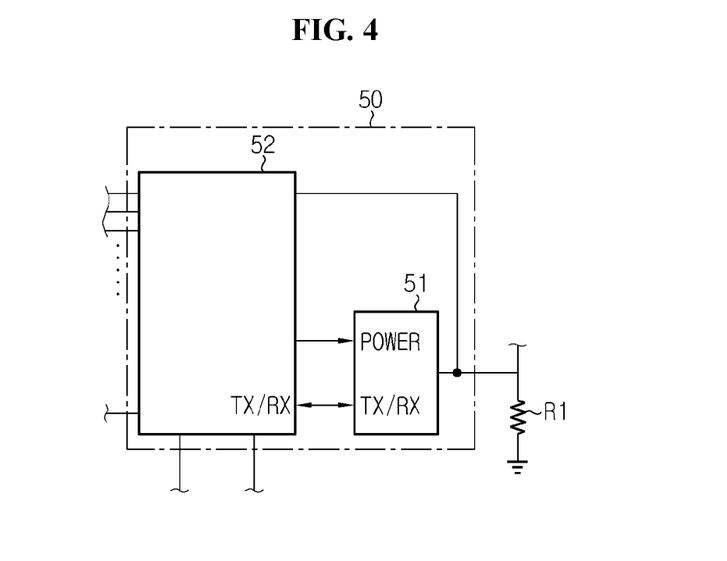
FIGS. 4 and 5 are diagrams showing a detailed configuration of a control unit shown in FIGS. 1 to 3.
Figure 5:
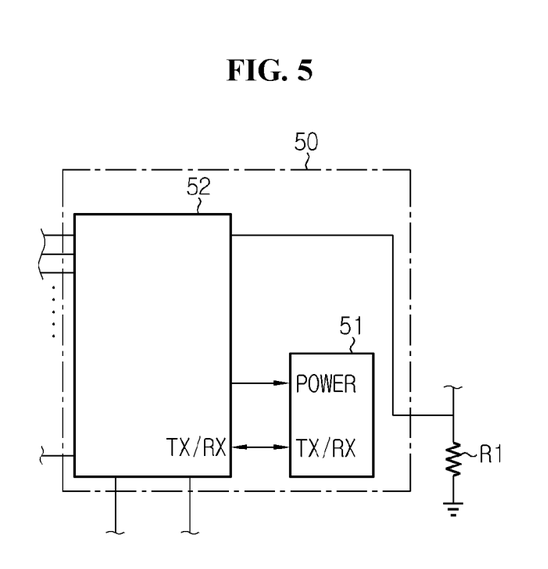

FIGS. 4 and 5 are diagrams showing a detailed configuration of the control unit 50 shown in FIGS. 1 to 3.

First, referring to FIG. 4, the control unit 50 includes a main control module 51 and a subcontrol module 52. Each of the main control module 51 and the subcontrol module 52 may be electrically connected to the second end of the resistor R1 in common to independently detect the voltage across the resistor R1.

The subcontrol module 52 is configured to measure the voltage across the battery module 20, and transmit a voltage signal indicating the measured module voltage to the main control module 51. Here, the module voltage may refer to the voltage between the positive electrode terminal and the negative electrode terminal of the battery module 20 or the voltage of each battery cell. For convenience, the subcontrol module 52 may be referred to as an 'analog front end'.

The main control module 51 is operably coupled to the subcontrol module 52. The main control module 51 may selectively include a processor, an application-specific integrated circuit (ASIC), a chipset, a logic circuit, a register, a communication modem and a data processing device known in the art to execute various control logics. At least one of the various control logics that can be executed by the main control module 51 may be combined, and the combined control logics may be written in computer-readable coding systems and stored in computer-readable recording media. The recording media is not limited to a particular type and includes any type that can be accessed by the processor included in the computer. For example, the recording media may include at least one selected from the group consisting of ROM, RAM, register, CD-ROM, magnetic tape, hard disk, floppy disk and an optical data recording device.

The main control module 51 is configured to generate a switching signal to control at least one of the charge switch 41 and the discharge switch 42 in turn on state based on the voltage signal from the subcontrol module 52 or the command from the external device 100.

In detail, when the first connector 30 is electrically separated from the second connector 110, the voltage of the resistor R1 will be 0V, thus the control unit 50 may operate in sleep state. When the first power terminal P1 of the first connector 30 and the first auxiliary terminal Pa are electrically connected by the second connector 110 or some conductor at a point in time, the voltage of the resistor R1 will be higher than 0V.

The subcontrol module 52 may determine if the voltage of the resistor R1 is in a preset threshold range by repeatedly detecting the voltage of the resistor R1 periodically or aperiodically. The threshold ranges for each of the embodiments shown in FIGS. 1 to 3 may be identical or different, but it is obvious to those skilled in the art that the lower limit of all the threshold ranges will be larger than 0V. Each resistor included in the voltage divider described above with reference to FIGS. 1 to 3 has a preset resistance value, and only when the first connector 30 is coupled to the second connector 110, the voltage of the resistor R1 is in the threshold range, and when the first connector 30 is coupled to some conductor, the voltage of the resistor R1 will be outside of the threshold range.

When the voltage across the resistor R1 is in the threshold range, the subcontrol module 52 may supply an operating voltage (e.g., 3.3V) to the main control module 51 using a power supply circuit embedded therein. The main control module 51 which operates in sleep state may shift to wakeup state when the operating voltage is supplied from the subcontrol module 52. In wakeup state, the main control module 51 may charge or discharge the battery module 20 by controlling the switching unit 40.

When the first power terminal P1 is separated from the third power terminal P3 or the first auxiliary terminal Pa is separated from the second auxiliary terminal Pb while the main control module 51 operates in wakeup state by the operating voltage, charge and discharge of the battery pack 10 by the external device 100 stops and the voltage of the resistor R1 reduces to 0V outside of the threshold range. In this case, the main control module 51 may transmit a shutdown command to the subcontrol module 52.

The subcontrol module 52 stops supplying the operating power to the main control module 51 in response to the shutdown command from the main control module 51. Accordingly, the main control module 51 shifts back from wakeup state to sleep state.

Subsequently, referring to FIG. 5, dissimilar to FIG. 4, the second end of the resistor R1 may be only electrically connected to the subcontrol module 52 among the subcontrol module 52 and the main control module 51. That is, electrical connection between the second end of the resistor R1 and the main control module 51 may be omitted. In this case, a process of shift from sleep state to wakeup state is the same as described above with reference to FIG. 4, while from a process of shift back from wakeup state to sleep state is different from FIG. 4. In detail, the subcontrol module 52 monitors the voltage of the resistor R1 during operation of the main control module 51 in wakeup state, and when the voltage of the resistor R1 is outside of the threshold range, stops supplying the operating voltage to the main control module 51 without a shutdown command from the main control module 51. Accordingly, the main control module 51 does not monitor the voltage of the resistor R1, and operates in sleep state or wakeup state depending on whether the operating voltage is supplied from the subcontrol module 52.

In the power system 1 according to FIG. 1 or 3, the control unit 50 may determine whether the external device 100 is a charger or an electric powered device body according to the voltage across the resistor R1. In detail, when the resistance value of the resistor R3 included in the charger is set differently from the resistance value of the resistor R3 included in the electric powered device body, the voltage of the resistor R1 when the charger is coupled to the battery pack 10 is different from the voltage of the resistor R1 when the electric powered device body is coupled to the battery pack 10. Accordingly, when the voltage of the resistor R1 is between a first value and a second value in the threshold range, the control unit 50 may determine that the battery pack 10 is coupled to the charger, and control the FET of the charge switch 41 into turn on state and the FET of the discharge switch 42 into turn off state. When the voltage of the resistor R1 is between a third value and a fourth value in the threshold range, the control unit 50 may determine that the battery pack 10 is coupled to the electric powered device body, and control the FET of the charge switch 41 into turn off state and the FET of the discharge switch 42 into turn on state.

Figure 6:
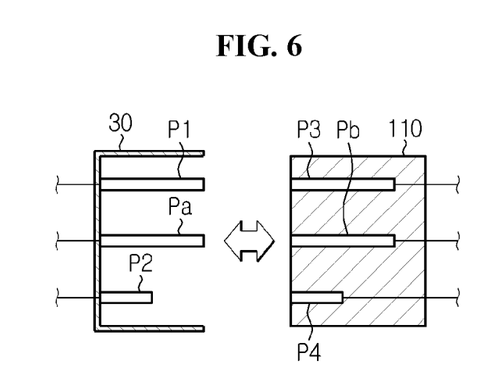
FIG. 6 is a schematic diagram showing a coupling structure of a first connector and a second connector shown in FIGS. 1 to 3.

FIG. 6 is a schematic diagram showing the coupling structure of the first connector and the second connector 110 shown in FIGS. 1 to 3.

In the coupling of the first connector 30 and the second connector 110, electrical connection between the first power terminal P1 and the third power terminal P3 and electrical connection between the first auxiliary terminal Pa and the second auxiliary terminal Pb may be made earlier than electrical connection between the second power terminal P2 and the fourth power terminal P4.

To this end, the terminals included in any one of the first connector 30 and the second connector 110 may have a pin shape, and each terminal of pin shape may have a different length from at least one of the other terminals.

FIG. 6 shows the structure in which the terminals of the first connector 30 are connected to the terminals of the second connector 110 in the shape of pins. Referring to FIG. 6, the pin length of the first power terminal P1 and the first auxiliary terminal Pa may be longer than the pin length of the second power terminal P2. Accordingly, when physically coupling the first connector 30 to the second connector 110, the first power terminal P1 and the first auxiliary terminal Pa are electrically connected to the third power terminal P3 and the second auxiliary terminal Pb, and then the second power terminal P2 is electrically connected to the fourth power terminal P4.

The embodiments of the present disclosure described hereinabove are not implemented only through the apparatus and method, and may be implemented through programs that realize the functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A battery pack, comprising:
a battery module comprising:
a positive electrode terminal; and
a negative electrode terminal;
a first connector comprising:
a first power terminal connected to the positive electrode terminal;
a second power terminal connected to the negative electrode terminal; and
a first auxiliary terminal;
a first resistor comprising:
a first end electrically connected to a ground; and
a second end electrically connected to the first auxiliary terminal;
a switching unit electrically connected between the negative electrode terminal and the second power terminal; and
a control unit electrically connected to the battery module, the switching unit, and the second end of the first resistor,
wherein the control unit is configured to operate, based on a voltage across the first resistor, in one of: a wakeup state and a sleep state, and
wherein the control unit comprises:
a subcontrol module electrically connected to the second end of the first resistor, the subcontrol module being configured to measure a voltage across the battery module, and
a main control module configured to:

receive a voltage signal indicating the voltage across the battery module from the subcontrol module, and
transmit a control signal to the subcontrol module based on the voltage signal.

2. The battery pack according to claim 1, further comprising a second resistor electrically connected between the second end of the first resistor and the first auxiliary terminal.

3. The battery pack according to claim 1, wherein:
the subcontrol module is further configured to supply an operating power to the main control module when the voltage across the first resistor is in a threshold range; and
the main control module is further configured to shift from the sleep state to the wakeup state when the operating power is supplied from the subcontrol module.

4. The battery pack according to claim 3, wherein:
the main control module is further configured to transmit a shutdown command to the subcontrol module when the voltage across the first resistor is outside of the threshold range while the main control module operates in the wakeup state; and
the subcontrol module is further configured to stop supplying the operating power to the main control module, in response to the shutdown command from the main control module.

5. The battery pack according to claim 3, wherein the subcontrol module is further configured to stop supplying the operating power to the main control module when the voltage across the first resistor is outside of the threshold range while the main control module operates in the wakeup state.

6. The battery pack according to claim 1, wherein:
the switching unit comprises:
a charge switch; and
a discharge switch connected in series with the charge switch; and
the control unit is further configured to stop outputting a switching signal for the charge switch and the discharge switch while the control unit operates in the sleep state.

7. A power system, comprising:
the battery pack of claim 1; and
an external device configured to be attached and detached to/from the battery pack, the external device comprising:
a second connector comprising a third power terminal connectable to the first power terminal of the first connector;
a fourth power terminal configured to be connected to the second power terminal of the first connector; and
a second auxiliary terminal configured to be connected to the first auxiliary terminal,
wherein the third power terminal and the second auxiliary terminal are electrically connected to each other.

8. The power system according to claim 7, wherein the external device further comprises a third resistor electrically connected between the third power terminal and the second auxiliary terminal.

9. The power system according to claim 7, wherein the external device further comprises a protective capacitor electrically connected between the third power terminal and the fourth power terminal.

10. The power system according to claim 7, wherein the second connector is configured to be electrically connected between the first power terminal and the third power terminal and to be electrically connected between the first auxiliary terminal and the second auxiliary terminal before the second connector is electrically connected between the second power terminal and the fourth power terminal, when coupled to the first connector.

11. A method of operating a battery pack comprising a battery module comprising a positive electrode terminal and a negative electrode terminal, a first connector comprising a first power terminal connected to the positive electrode terminal, a second power terminal connected to the negative electrode terminal, and a first auxiliary terminal, a first resistor comprising a first end electrically connected to a ground and a second end electrically connected to the first auxiliary terminal, a switching unit electrically connected between the negative electrode terminal and the second power terminal, the method comprising:
  operating, by a control unit, the battery pack in a wakeup state or a sleep state based on a voltage across the first resistor, the control unit being electrically connected to the battery module, the switching unit, and the second end of the first resistor;
  measuring a voltage across the battery module by a subcontrol module electrically connected to the second end of the first resistor;
  receiving, by a main control module, a voltage signal indicating the voltage across the battery module from the subcontrol module; and
  transmitting, by the main control module, a control signal to the subcontrol module based on the voltage signal.

12. The method of claim 11, further comprising:
  supplying, by the subcontrol module, an operating power to the main control module when the voltage across the first resistor is in a threshold range; and
  shifting, by the main control module, from the sleep state to the wakeup state when the operating power is supplied from the subcontrol module.

13. The method of claim 12, further comprising:
  transmitting, by the main control module, a shutdown command to the subcontrol module when the voltage across the first resistor is outside of the threshold range while the main control module operates in the wakeup state; and
  stopping supplying, by the subcontrol module, the operating power to the main control module, in response to the shutdown command from the main control module.

14. The method of claim 12, further comprising stopping supplying, by the subcontrol module, the operating power to the main control module when the voltage across the first resistor is outside of the threshold range while the main control module operates in the wakeup state.

15. The method of claim 14, wherein:
  the subcontrol module directly monitors the voltage of the first resistor; and
  the main control module does not directly monitor the voltage of the first resistor.

16. The method of claim 11, wherein:
  the switching unit comprises:
    a charge switch; and
    a discharge switch connected in series with the charge switch; and
  the method further comprises stopping outputting, by the control unit, a switching signal for the charge switch and the discharge switch while the control unit operates in the sleep state.

17. The method of claim 11, further comprising:
  attaching an external device to the battery pack, or detaching the external device from the battery pack, the external device comprising:
    a second connector comprising a third power terminal connectable to the first power terminal of the first connector;
    a fourth power terminal configured to be connected to the second power terminal of the first connector; and
    a second auxiliary terminal configured to be connected to the first auxiliary terminal of the first connector,
  wherein the third power terminal and the second auxiliary terminal are electrically connected to each other.

18. The method of claim 17, wherein the external device further comprises a protective capacitor electrically connected between the third power terminal and the fourth power terminal.

19. The method of claim 17, further comprising electrically connecting the second connector between the first power terminal and the third power terminal and between the first auxiliary terminal and the second auxiliary terminal before electrically connecting the second connector between the second power terminal and the fourth power terminal, when coupled to the first connector.

* * * * *